(12) United States Patent
Yamane

(10) Patent No.: US 12,719,382 B2
(45) Date of Patent: Aug. 25, 2026

(54) INTEGRATED CIRCUIT AND POWER SUPPLY CIRCUIT

(71) Applicant: FUJI ELECTRIC CO., LTD., Kawasaki (JP)

(72) Inventor: Hiroki Yamane, Matsumoto-city (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 166 days.

(21) Appl. No.: 18/819,911

(22) Filed: Aug. 29, 2024

(65) Prior Publication Data

US 2025/0125741 A1 Apr. 17, 2025

(30) Foreign Application Priority Data

Oct. 12, 2023 (JP) ................................ 2023-176881

(51) Int. Cl.
*H02M 7/217* (2006.01)
*H02M 1/00* (2006.01)

(52) U.S. Cl.
CPC ......... *H02M 7/217* (2013.01); *H02M 1/0025* (2021.05)

(58) Field of Classification Search
CPC ......... H02M 3/33538; H02M 3/33546; H02M 3/33515; H02M 3/33576; H02M 3/33553; H02M 3/33507; H02M 3/33592; H02M 3/33523; H02M 3/3353; H02M 3/33569
See application file for complete search history.

(56) References Cited

U.S. PATENT DOCUMENTS

2011/0222318 A1 9/2011 Uno et al.
2014/0104894 A1 4/2014 Yamane
2017/0079098 A1* 3/2017 Mitterbacher .... H02M 3/33507

FOREIGN PATENT DOCUMENTS

JP 2011-188632 A 9/2011
JP 2014-064392 A 4/2014
JP 2014-082831 A 5/2014

* cited by examiner

*Primary Examiner* — Bryan R Perez
(74) *Attorney, Agent, or Firm* — Rabin & Berdo, P.C.

(57) ABSTRACT

An integrated circuit for a power supply circuit that generates an output voltage at a target level, the power supply circuit including a transformer and a transistor. The integrated circuit drives the transistor, and includes: a first terminal receiving a power supply voltage corresponding to a coil voltage at an auxiliary coil of the transformer; a determination circuit configured to determine whether the target level is a first level or a second level based on the coil voltage; a first comparator circuit configured to compare a first voltage corresponding to the power supply voltage with a first reference voltage, which is at a third level and a fourth level when the target level is the first level and the second level, respectively; and a driver circuit configured to drive, and to stop driving, the transistor when the first voltage is higher and lower than the first reference voltage, respectively.

7 Claims, 10 Drawing Sheets

INTEGRATED CIRCUIT AND POWER SUPPLY CIRCUIT

CROSS-REFERENCE TO RELATED APPLICATIONS

The present application claims priority pursuant to 35 U.S.C. § 119 from Japanese patent application number 2023-176881, filed on Oct. 12, 2023, the entire disclosure of which is hereby incorporated by reference herein.

BACKGROUND

Technical Field

The present disclosure relates to an integrated circuit and a power supply circuit.

Description of the Related Art

Some control ICs for AC-DC converters operate based on a power supply voltage generated from the auxiliary winding of a transformer, and suppress an operation of resetting a control IC even if the power supply voltage drops due to a drop in the voltage at the auxiliary winding (for example, Japanese Patent Application Publication Nos. 2014-082831, 2014-064392, and 2011-188632).

When a load enters a light load state, the control IC lowers the threshold voltage at which the operation of resetting a control IC to the power supply voltage is caused, based on a feedback voltage corresponding to the output voltage on the secondary side, thereby suppressing such a reset operation.

However, it is difficult to use the above-described control IC in an AC-DC converter that is capable of switching the target level of the output voltage. Specifically, when the control IC switches the target level of the output voltage to a higher level, the output voltage is detected as having been lowered. Thus, if the feedback voltage rises, the control IC raises the threshold voltage while the voltage from the auxiliary winding remains low, which makes it more likely to cause the reset operation.

SUMMARY

An aspect of the present disclosure is an integrated circuit for a power supply circuit configured to generate an output voltage from an input voltage thereof and control the output voltage so as to be a target level, the power supply circuit including a transformer that includes a primary coil, a secondary coil, and an auxiliary coil, and a transistor configured to control a current flowing through the primary coil, the integrated circuit being configured to drive the transistor, the integrated circuit comprising: a first terminal configured to receive a power supply voltage corresponding to a coil voltage at the auxiliary coil; a determination circuit configured to determine whether the target level of the output voltage is a first level or a second level lower than the first level, based on the coil voltage; a first comparator circuit configured to compare a first voltage corresponding to the power supply voltage with a first reference voltage at a third level, when the target level is the first level, and compare the first voltage with the first reference voltage at a fourth level lower than the third level, when the target level is the second level; and a driver circuit configured to drive the transistor when the first voltage is higher than the first reference voltage, and stop driving the transistor when the first voltage is lower than the first reference voltage.

Another aspect of the present disclosure is a power supply circuit configured to generate an output voltage from an input voltage and control the output voltage so as to be a target level, the power supply circuit comprising: a transformer including a primary coil, a secondary coil, and an auxiliary coil; a transistor configured to control a current flowing through the primary coil; and an integrated circuit configured to drive the transistor, the integrated circuit including a first terminal configured to receive a power supply voltage corresponding to a coil voltage of the auxiliary coil, a determination circuit configured to determine whether the target level of the output voltage is a first level or a second level lower than the first level, based on the coil voltage, a first comparator circuit configured to compare a first voltage corresponding to the power supply voltage with a first reference voltage at a third level, when the target level is the first level, and compare the first voltage with the first reference voltage at a fourth level lower than the third level, when the target level is the second level, and a driver circuit configured to drive the transistor, when the first voltage is higher than the first reference voltage, and stop driving the transistor, when the first voltage is lower than the first reference voltage.

DETAILED DESCRIPTION

At least following matters will become apparent from the descriptions of the present description and the accompanying drawings.

Embodiments

Figure 1:
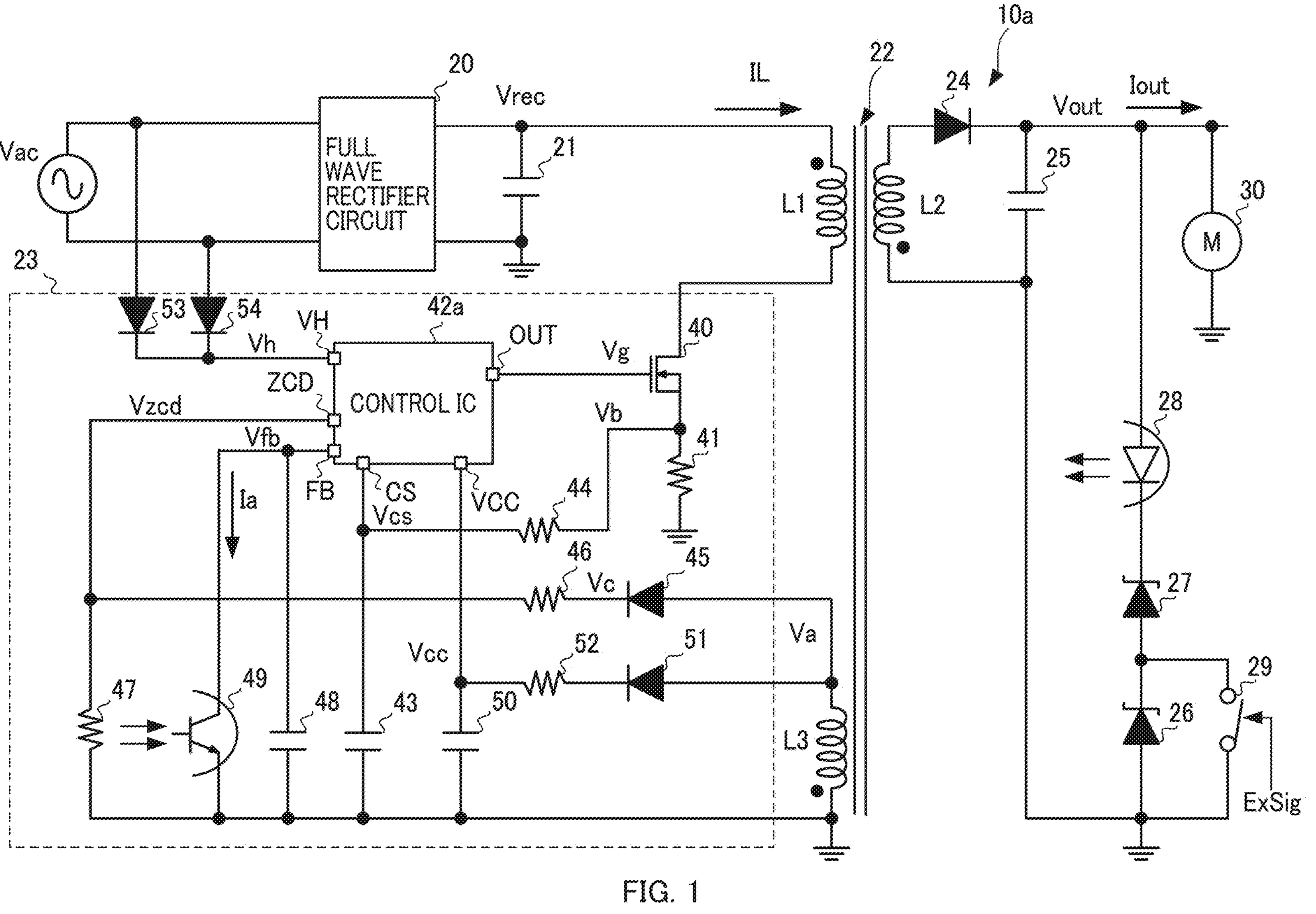
FIG. 1 is a diagram illustrating an example of a configuration of an AC-DC converter 10*a*.

FIG. 1 is a diagram illustrating an example of a configuration of an AC-DC converter 10*a* according to an embodiment of the present disclosure. The AC-DC converter 10*a* is a flyback power supply circuit that generates an output voltage Vout from an alternating-current (AC) voltage Vac of a commercial power supply, to thereby control the output voltage Vout so as to be at a target level. Note that the AC voltage Vac is, for example, a voltage of 100 to 240 V with a frequency of 50 to 60 Hz. Further, the AC voltage Vac corresponds to an “input voltage”.

<<<Overview of AC-DC Converter 10*a*>>>

The AC-DC converter 10*a* includes a full-wave rectifier circuit 20, capacitors 21 and 25, a transformer 22, a control block 23, a diode 24, Zener diodes 26 and 27, a light-emitting diode 28, and a switch 29. The AC-DC converter 10*a* then supplies power to a motor 30 included in a printer, for example. The motor 30 is a load connected to the AC-DC converter 10*a*, and the output voltage Vout is applied to the motor 30.

The full-wave rectifier circuit 20 full-wave rectifies the predetermined AC voltage Vac with noise removed, and outputs a resultant voltage, as a voltage Vrec, to a primary coil L1 of the transformer 22 and the capacitor 21. The capacitor 21 smooths the voltage Vrec.

The transformer 22 includes the primary coil L1, and a secondary coil L2 and an auxiliary coil L3 that are magnetically connected to the primary coil L1. The secondary coil L2 and the auxiliary coil L3 are formed by winding such that voltages generated at the secondary coil L2 and the auxiliary coil L3 have a polarity opposite to a voltage generated at the primary coil L1.

The control block 23 controls an inductor current IL flowing through the primary coil L1 on the primary side of the transformer 22, to thereby control the voltage generated at the secondary coil L2 on a secondary side of the transformer 22. As a result, the output voltage Vout of the target level is generated on the secondary side of the transformer 22.

The diode 24 rectifies a current from the secondary coil L2 of the transformer 22, and supplies the rectified current to the capacitor 25. The capacitor 25 is charged with the current from the diode 24, and thus the output voltage Vout is generated at the capacitor 25.

The Zener diodes 26 and 27 and the light emitting diode 28 are connected in series between the cathode of the diode 24 and ground. Further, the Zener diodes 26 and 27 are connected in series such that a voltage corresponding to the output voltage Vout is applied as a reverse voltage. The light-emitting diode 28 is provided between the cathode of the diode 24 and the cathode of the Zener diode 27.

The Zener diodes 26 and 27 are elements that output a constant voltage upon receiving the reverse voltage.

The light-emitting diode 28 is an element that emits light having an intensity according to a voltage between the output voltage Vout and the cathode of the Zener diode 27.

The switch 29 is connected in parallel with the Zener diode 26, and is turned on and off in response to an external signal ExSig from a device (for example, a printer) that controls the motor 30. Note that for example, in response to the motor 30 entering a standby state with the printer entering the standby state, the switch 29 is turned on, in response to the external signal ExSig from the printer. Further, upon turning on of the switch 29, the reverse voltage is not applied to the Zener diode 26, and the Zener diode 26 no longer outputs the constant voltage, and thus the voltage difference between the output voltage Vout and the voltage at the cathode of the Zener diode 27 increases. As the voltage difference increases, the light emitting diode 28 emits light with a greater intensity.

Further, when the switch 29 is turned off, the voltage at the cathode of the Zener diode 27 results in a voltage (for example, 32 V) obtained by adding up the voltages outputted by the Zener diodes 26 and 27. The target level of the output voltage Vout in this case is defined as a first level. Meanwhile, when the switch 29 is turned on, the voltage at the cathode of the Zener diode 27 results in the voltage outputted by the Zener diode 27 (for example, 12 V). The target level of the output voltage Vout in this case is defined as a second level.

<<<Overview of Control Block 23>>>

The control block 23 is a circuit block to control the AC-DC converter 10*a*. The control block 23 includes a power transistor 40, resistors 41, 44, 46, 47 and 52, a control IC 42*a*, capacitors 43, 48, and 50, diodes 45 and 51, and a phototransistor 49.

The power transistor 40 is an N-channel metal-oxide-semiconductor (NMOS) transistor to control power that is to be supplied to the motor 30. In an embodiment of the present disclosure, the power transistor 40 is a Metal Oxide Semiconductor (MOS) transistor, but it is not limited thereto. The power transistor 40 may be, for example, an Insulated Gate Bipolar Transistor (IGBT) or the like, as long as it is a transistor capable of controlling power. Further, the power transistor 40 corresponds to a "transistor".

The resistor 41 is a resistor to detect the inductor current IL flowing through the primary coil L1 when the power transistor 40 is on, and the resistor 41 has one end connected to the source electrode of the power transistor 40, and the other end that is grounded.

The control IC 42*a* is an integrated circuit that controls switching of the power transistor 40 such that the output voltage Vout reaches the target level. In specific, the control IC 42*a* drives the power transistor 40, based on the inductor current IL and the output voltage Vout.

Note that the control IC 42*a* has terminals CS, FB, OUT, VCC, VH, and ZCD, and details of the control IC 42*a* will be described later. The gate electrode of the power transistor 40 is connected to the terminal OUT. Further, the control IC 42*a* actually has other terminals as well, however, they are omitted for convenience.

The capacitor 43 is provided between the terminal CS and the ground, and receives, through the resistor 44, the voltage at the resistor 41 that is generated with the inductor current IL flowing through the power transistor 40 when the power transistor 40 is on. Note that the capacitor 43 and the resistor 44 configure a low-pass filter, and stabilize a voltage Vcs at the terminal CS. Note that the terminal CS corresponds to a "third terminal".

The diode 45 has an anode connected to the auxiliary coil L3, and a cathode connected to the resistor 47 through the resistor 46. Further, the resistors 46 and 47 configure a voltage divider circuit, and divide a voltage corresponding to a coil voltage Va of the auxiliary coil L3. Accordingly, when the power transistor 40 is off, the voltage corresponding to the coil voltage Va of the auxiliary coil L3 is applied to the terminal ZCD. Further, the voltage level of the voltage Vzcd applied to the terminal ZCD can be set by adjusting the voltage division ratio of the voltage divider circuit that includes the resistors 46 and 47. Note that the terminal ZCD corresponds to a "second terminal".

The capacitor 48 is provided between the terminal FB and the ground, to stabilize a voltage Vfb at the terminal FB. The voltage Vfb is a feedback voltage corresponding to the output voltage Vout, and is applied to the terminal FB. The control IC 42*a* turns on the power transistor 40 with a frequency corresponding to the voltage Vfb. Usually, in response to the voltage Vcs exceeding the voltage Vfb while the power transistor 40 is on, the control IC 42*a* turns off the power transistor 40. Further, here, the control IC 42*a* compares the voltage Vcs with the voltage Vfb to turn off the power transistor 40, but it may also be configured to compare a voltage corresponding to the voltage Vcs with a voltage corresponding to the voltage Vfb to turn off the power transistor 40.

The phototransistor 49 is provided between the terminal FB and the ground, and configures a photocoupler together with the light-emitting diode 28 on the secondary side of the transformer 22. Further, in response to the intensity of the light emitted by the light-emitting diode 28 increasing, the phototransistor 49 passes a larger sink current Ia to the terminal FB. That is, in response to the output voltage Vout rising higher than the target level and the intensity of the light from the light-emitting diode 28 increasing stronger, the phototransistor 49 passes a larger sink current Ia to the terminal FB. Thus, in response to the output voltage Vout rising higher than the target level, the voltage level of the voltage Vfb drops.

The capacitor 50 is provided between the terminal VCC and the ground. The diode 51 has an anode connected to the auxiliary coil L3 and a cathode connected to the terminal VCC through the resistor 52. The voltage Va generated at the auxiliary coil L3 is applied to the capacitor 50 through the diode 51 and the resistor 52, and the voltage at the capacitor 50 serves as a power supply voltage Vcc of the control IC 42*a*. When the power transistor 40 is off, the voltage corresponding to the voltage Va at the auxiliary coil L3, in other words, the voltage at the capacitor 50, is applied to the terminal VCC.

Here, the voltage Vfb changes with the output voltage Vout and determines the current value of the inductor current IL. In other words, the output voltage Vout determines the current value of the inductor current IL. With a change in the current value of the inductor current IL, the voltage Va changes. Further, with a change in the voltage Va, the voltage Vzcd when the power transistor 40 is off and the power supply voltage Vcc change. Further, in response to the inductor current IL decreasing, the voltage Va decreases, the voltage Vzcd when the power transistor 40 is off decreases, and the power supply voltage Vcc drops. Note that the terminal VCC corresponds to a "first terminal", and the voltage Va corresponds to a "coil voltage".

Accordingly, when the target level of the output voltage Vout changes from the first level (for example, 32 V) to the second level (for example, 12 V), the voltage Vzcd when the power transistor 40 is off also changes. Thus, by detecting the change in the voltage Vzcd when the power transistor 40 is off, it is possible to detect a change in the target level of the output voltage Vout.

<Configuration of Control IC 42*a*>>>

Figure 2:
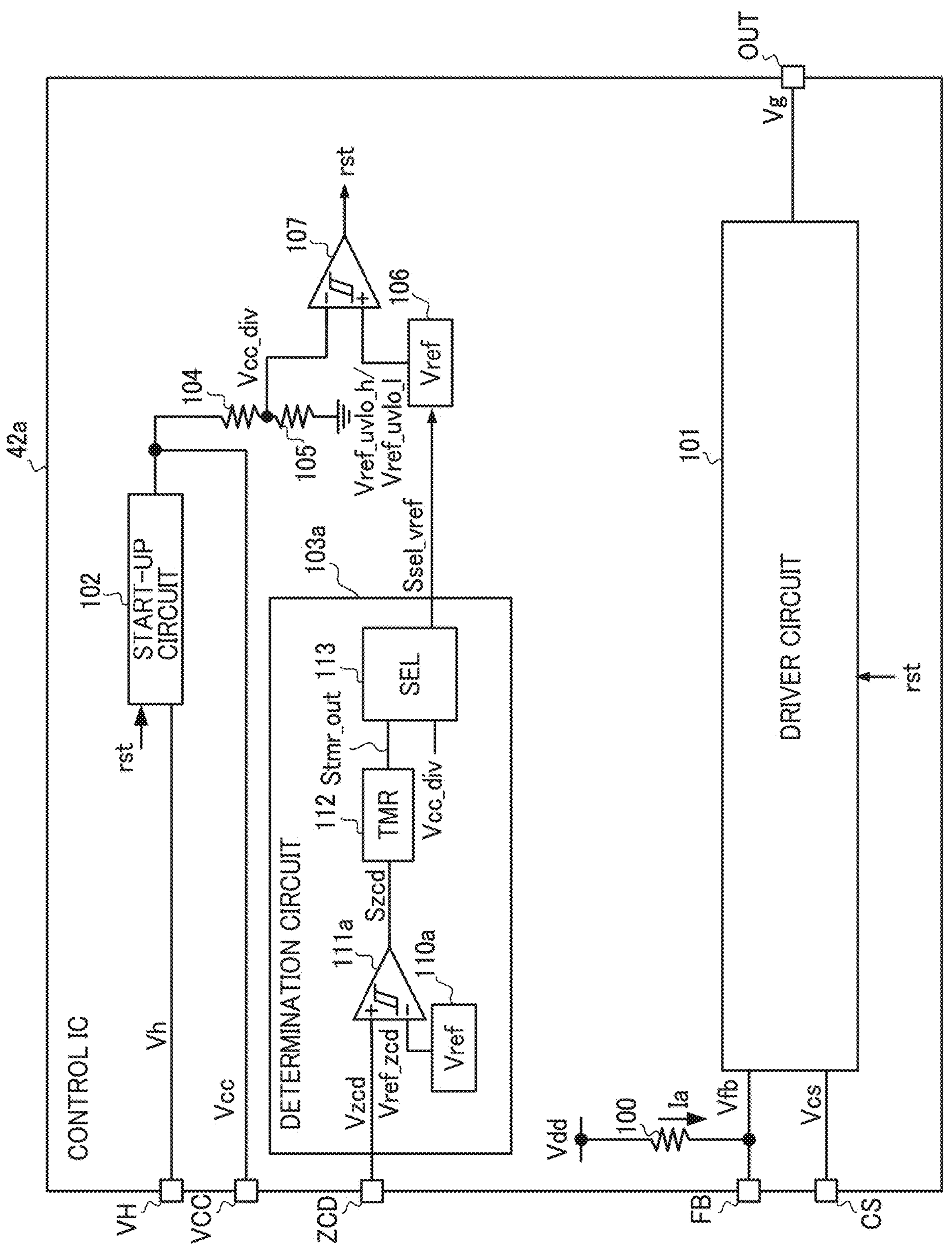
FIG. 2 is a diagram illustrating an example of a configuration of a control IC 42*a*.

FIG. 2 is a diagram illustrating an example of a configuration of the control IC 42*a*. The control IC 42*a* drives the power transistor 40 by a drive voltage Vg, based on the feedback voltage Vfb and the inductor current IL, so that the AC-DC converter 10*a* outputs the output voltage Vout at the target level. The control IC 42*a* includes resistors 100, 104, and 105, a driver circuit 101, a start-up circuit 102, a determination circuit 103*a*, a reference voltage circuit 106, and a hysteresis comparator 107.

==Resistor 100==

The resistor 100 is provided between the terminal FB and a node that receives an internal voltage Vdd generated according to the power supply voltage Vcc by a regulator (not illustrated), and generates the feedback voltage Vfb corresponding to the sink current Ia passed by the phototransistor 49. That is, in response to the output voltage Vout rising higher than the target level and the sink current Ia increasing, the feedback voltage Vfb drops.

Further, in response to the target level of the output voltage Vout dropping from the first level to the second level, the output voltage Vout results in being higher than the second level, and thus the intensity of the light from the light-emitting diode 28 increases and the phototransistor 49 passes a larger sink current Ia. As a result, in response to the target level of the output voltage Vout dropping to the second level, the feedback voltage Vfb drops.

===Driver Circuit 101===

The driver circuit 101 turns on the power transistor 40 with the period of an oscillator signal corresponding to the feedback voltage Vfb, and outputs the drive voltage Vg to turn off the power transistor 40, in response to the voltage Vcs reaching the feedback voltage Vfb while the power transistor 40 is on. Further, the driver circuit 101 drives the power transistor 40, in response to the hysteresis comparator 107 (described later) outputting a signal rst indicating release of the reset state of the control IC 42*a*. Meanwhile, the driver circuit 101 stops driving the power transistor 40, in response to the hysteresis comparator 107 (described later) outputting the signal rst indicating reset of the control IC 42*a*. Here, when the control IC 42*a* is "released from reset", it becomes operable, and when the control IC 42*a* is "reset", it stops operating.

==Start-Up Circuit 40==

The start-up circuit 102 charges the capacitor 50, which is provided outside the control IC 42*a*, with a voltage Vh applied through the terminal VH, based on the voltage Vcc at the terminal VCC, and generates the voltage Vcc, at the start-up of the DC-DC converter 10*a*. At the start-up, the start-up circuit 102 operates in response to the AC voltage Vac being applied, stops operating in response to the voltage Vcc reaching a predetermined level, and again operates in response to the voltage Vcc dropping from the predetermined level by a certain level. Further, in response to the hysteresis comparator 107 (described later) outputting the signal rst indicating reset, the start-up circuit 102 operates.

===Determination Circuit 103*a*===

The determination circuit 103*a* determines whether the target level of the output voltage Vout of the AC-DC converter 10*a* is the first level or the second level, based on the voltage Vzcd at the terminal ZCD, which is a voltage corresponding to the voltage Va at the auxiliary coil L3. The determination circuit 103*a* includes a reference voltage circuit 110*a*, a hysteresis comparator 111*a*, a timer (TMR) 112, and a selector circuit (SEL) 113.

===Reference Voltage Circuit 110*a*===

The reference voltage circuit 110*a* outputs a reference voltage Vref_zcd.

====Hysteresis Comparator 111*a*====

The hysteresis comparator 111*a* compares the voltage Vzcd with a voltage Vref_zcd_h, Vref_zcd_l generated from the reference voltage Vref_zcd, in order to determine the target level of the output voltage Vout of the AC-DC converter 10*a*. Specifically, when the voltage Vzcd exceeds the voltage Vref_zcd_h, the hysteresis comparator 111*a* outputs a signal Szcd at a high-level (hereinafter referred to as high or high level). Meanwhile, when the voltage Vzcd drops below the voltage Vref_zcd_l that is lower than the voltage Vref_zcd_h, the hysteresis comparator 111*a* outputs the signal Szcd at a low level (hereinafter referred to as low or low level). Note that the hysteresis comparator 111*a* corresponds to a "second comparator circuit", the voltage Vzcd corresponds to a "second voltage", and the reference voltage Vref_zcd corresponds to a "second reference voltage".

==Timer 112==

The timer 112 is a circuit to more reliably determine the target level of the output voltage Vout of the AC-DC converter 10*a*, in response to the signal Szcd. Specifically, when the time period during which the hysteresis comparator 111*a* continues outputting the low signal Szcd continues for a time period Tzcd_a, the timer 112 outputs a high signal Stmr_out indicating that the target level of the output voltage Vout is the second level. Meanwhile, when the time period during which the hysteresis comparator 111*a* outputs the high signal Szcd continues for the time period Tzcd_b, the timer 112 outputs the low signal Stmr_out indicating that the target level of the output voltage Vout is the first level. As a result, when the state in which the target level of the output voltage Vout of the AC-DC converter 10*a* has changed continues for a predetermined time period, the signal Stmr_out indicating the target level can be switched. Accordingly, even if the signal Szcd is erroneously outputted due to noise, the timer 112 suppresses erroneous detection of the target level of the output voltage Vout. Note that the timer 112 corresponds to an "output circuit", the signal stmr_out corresponds to a "determination result", the time period Tzcd_a corresponds to a "second time period", and the time period Tzcd_b corresponds to a "first time period".

===Selector Circuit 113===

Figure 3:
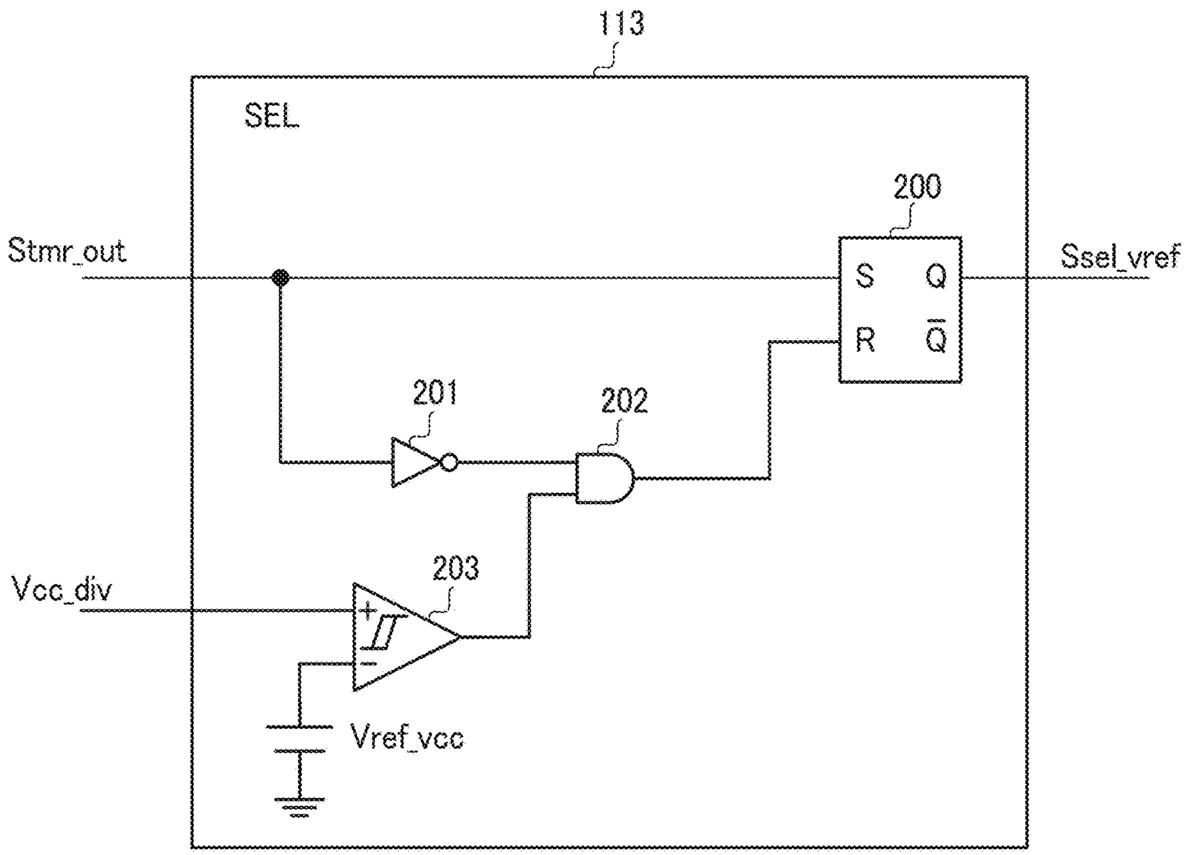
FIG. 3 is a diagram illustrating an example of a configuration of a selector circuit 113.

The selector circuit 113 switches the reference voltage that is to be outputted by the reference voltage circuit 106 (described later), based on a voltage Vcc_div corresponding to the power supply voltage Vcc and the signal Stmr_out. Specifically, the selector circuit 113 causes the reference voltage circuit 106 to output a reference voltage Vref_uvlo_l, in response to the high signal Stmr_out. Meanwhile, in response to the selector circuit 113 receiving the low signal Stmr_out and the voltage Vcc_div exceeding the voltage Vref_vcc, the selector circuit 113 causes the reference voltage circuit 106 to output a reference voltage Vref_uvlo_h that is higher than the reference voltage Vref_uvlo_l. As illustrated in FIG. 3, the selector circuit 113 includes an RS flip-flop circuit 200, an inverter circuit 201, an AND circuit 202, and a hysteresis comparator 203.

The RS flip-flop circuit 200 outputs a high signal Ssel_vref, in response to the high signal Stmr_out. In this case, the RS flip-flop circuit 200 causes the reference voltage circuit 106 to output the reference voltage Vref_uvlo_l. Meanwhile, in response to the RS flip-flop circuit 200 receiving the low signal Stmr_out and the voltage Vcc_div exceeding the reference voltage Vref_vcc, the RS flip-flop circuit 200 outputs the low signal Ssel_vref. In this case, the RS flip-flop circuit 200 causes the reference voltage circuit 106 to output the reference voltage Vref_uvlo_h, which is higher than the reference voltage Vref_uvlo_l.

In response to the inverter circuit 201 receiving the low signal Stmr_out and outputting a high signal to the AND circuit 202, and the hysteresis comparator 203 outputting a high signal thereto, the AND circuit 202 outputs a signal to reset the RS flip-flop circuit 200.

The hysteresis comparator 203 outputs the high signal, in response to the voltage Vcc_div exceeding the reference voltage Vref_vcc, and outputs a low signal, in response to the voltage Vcc_div dropping below the reference voltage Vref_vcc. Note that the hysteresis comparator 203 compares the voltage Vcc_div with two reference voltages that are based on the reference voltage Vref_vcc, so as not to malfunction even if noise occurs in the voltage Vcc_div. However, for convenience of explanation, a description has been given using the reference voltage Vref_vcc. Note that the voltage level of the reference voltage Vref_vcc corresponds to a "fifth level".

====Hysteresis Comparator 107====

The hysteresis comparator 107 compares a voltage Vcc_div obtained by dividing the power supply voltage Vcc by the resistors 104 and 105 with the reference voltage from the reference voltage circuit 106, to thereby output the reset signal rst as a comparison result. Specifically, in response to the voltage Vcc_div being lower than the reference voltage from the reference voltage circuit 106, the hysteresis comparator 107 outputs the signal rst indicating reset of the control IC 42*a*. Meanwhile, in response to the voltage Vcc_div exceeding the reference voltage from the reference voltage circuit 106, the hysteresis comparator 107 outputs the signal rst indicating release of the reset of the control IC 42*a*. Further, the reference voltage circuit 106 outputs, as the reference voltage, the voltage Vref_uvlo_l or the voltage Vref_uvlo_h higher than the voltage Vref_uvlo_l, based on the signal Ssel_vref from the determination circuit 103*a*.

It is temporarily assumed here that the reference voltage circuit 106 has switched the reference voltage from the voltage Vref_uvlo_l to the voltage Vref_uvlo_h by detecting that the target level rises to the first level from the second level due to a rise in the feedback voltage Vfb.

When operating as such, if the reference voltage from the reference voltage circuit 106 rises while the power supply voltage Vcc remains low, due to the target level being the second level, the operation of resetting the control Ic 42*a* becomes more likely to occur.

Meanwhile, in an embodiment of the present disclosure, the reference voltage circuit 106 outputs, as the reference voltage, either the reference voltage Vref_uvlo_h or Vref_uvlo_l, in response to the signal Ssel_vref from the determination circuit 103*a*. As will be described later in detail, with the reference voltage Vref_uvlo_l being outputted after the target level of the output voltage Vout of the AC-DC converter 10*a* is switched to the second level, the operation of resetting the control IC 42*a* is suppressed even in a situation in which the voltage Va from the auxiliary coil L3 in FIG. 1 is low and the power supply voltage Vcc is likely to drop.

Similarly, after the target level of the output voltage Vout of the AC-DC converter 10*a* is switched to the first level and the power supply voltage Vcc rises, the reference voltage Vref_uvlo_h is outputted, thereby suppressing the operation of resetting the control IC 42*a*. Note that the hysteresis comparator 107 corresponds to a "first comparator circuit", and the voltage Vcc_div corresponds to a "first voltage". Further, the reference voltage outputted by the reference voltage circuit 106 corresponds to a "first reference voltage", the voltage level of the voltage Vref_uvlo_h corresponds to a "third level", and the voltage level of the voltage Vref_uvlo_l corresponds to a "fourth level".

<<<Operation of Control IC 42*a*>>>

Figure 4:
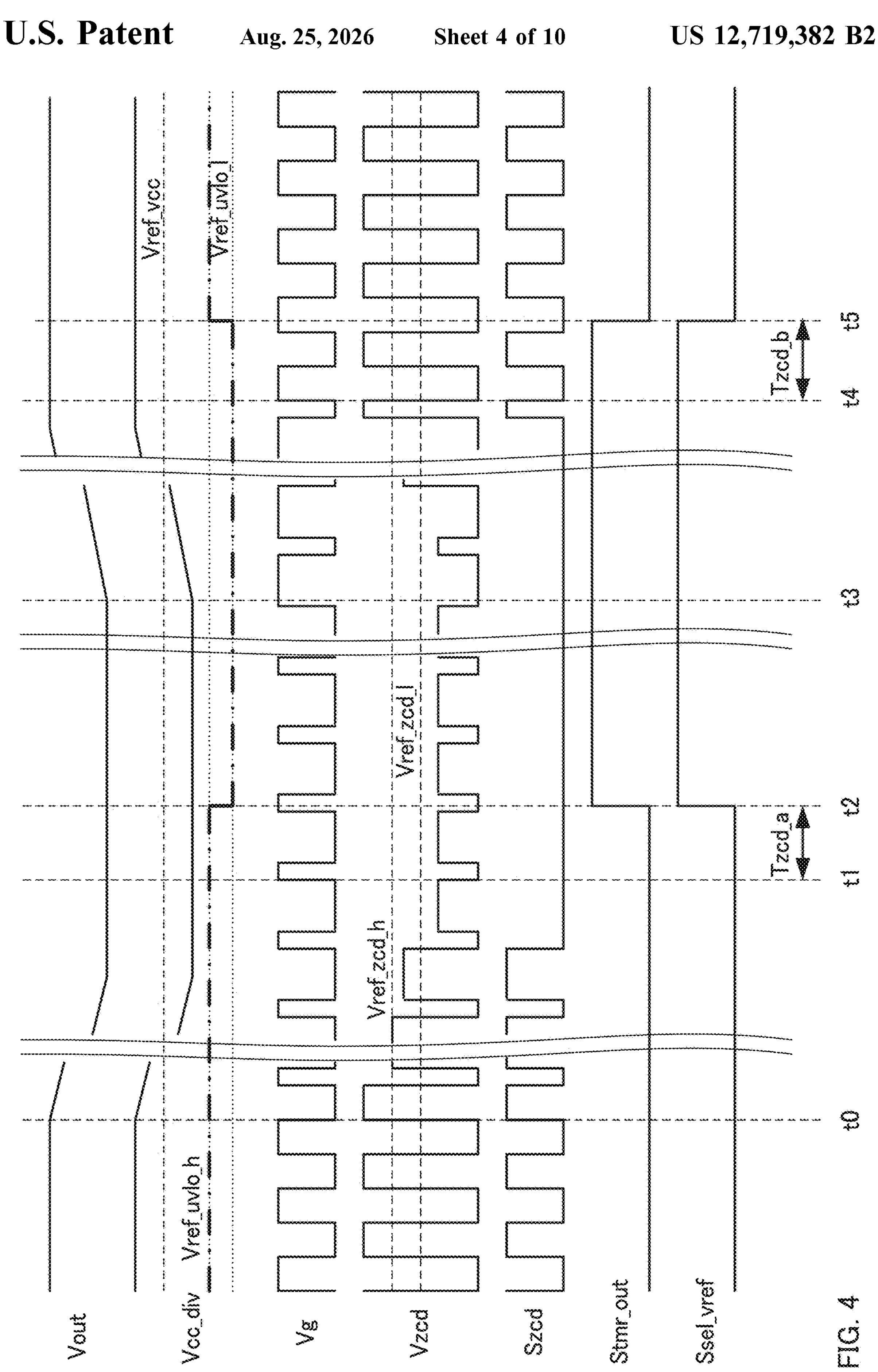
FIG. 4 is a diagram illustrating an example of an operation of a control IC 42*a*.

FIG. 4 is a diagram illustrating an example of an operation of the control IC 42*a*. It is assumed that the target level of the output voltage Vout of the AC-DC converter 10*a* is the first level, before time t0. The reference voltage outputted by the reference voltage circuit 106 is given by a dashed-dotted line below the voltage Vcc_div.

In response to the switch 29 being turned on and the target level of the output voltage Vout being switched to the second level at time t0, the output voltage Vout starts to drop. Further, the output voltage Vout is detected as being high and the feedback voltage Vfb drops, and thus the time period during which the power transistor 40 is on decreases in the switching period of the power transistor 40 in FIG. 1. As a result, the voltage Va at the auxiliary coil L3 in FIG. 1 drops, and the power supply voltage Vcc_div also starts to drop. Thus, the voltage Vzcd when the power transistor 40 is off gradually drops. However, since the voltage Vzcd is still higher than the reference voltage Vref_zcd_l, the hysteresis comparator 111*a* outputs a high signal Szcd when the power transistor 40 is off.

In response to the voltage Vzcd when the power transistor 40 is off dropping below the reference voltage Vref_zcd_l at time t1, the hysteresis comparator 111*a* outputs a low signal Szcd. This causes the timer 112 to start measuring the time period during which the low signal Szcd is received.

At time t2, at which the time period Tzcd_a has elapsed since time t1, the timer 112 outputs the high signal Stmr_out. Then, the selector circuit 113 outputs the high signal Ssel_vref. Thus, the reference voltage circuit 106 outputs the reference voltage Vref_uvlo_l as the reference voltage. This switches the target level of the output voltage Vout to the second level, and lowers the reference voltage of the hysteresis comparator 107 to the reference voltage Vref_uvlo_l even if the power supply voltage Vcc drops, and thus the operation of resetting the control IC is suppressed.

In response to the switch 29 being turned off and the target level of the output voltage Vout being switched to the first level at time t3, the output voltage Vout starts to rise. Further, since the feedback voltage Vfb rises, the time period during which the power transistor 40 is on increases in the switching period of the power transistor 40 in FIG. 1. As a result, the voltage Va at the auxiliary coil L3 rises, as well as the voltage Vcc_div also starts to rise. Thus, the voltage Vzcd when the power transistor 40 is off gradually rises. However, since the voltage Vzcd is still lower than the reference voltage Vref_zcd_h, the hysteresis comparator 111*a* outputs the low signal Szcd when the power transistor 40 is off.

In response to the voltage Vzcd when the power transistor 40 is off exceeding the reference voltage Vref_zcd_h at time t4, the hysteresis comparator 111*a* outputs the high signal Szcd. This causes the timer 112 to start measuring the time period during which the high signal Szcd is received.

At time t5, at which the time period Tzcd_b has elapsed since time t4, the timer 112 outputs the low signal Stmr_out. In this event, since the voltage Vcc_div exceeds the reference voltage Vref_vcc, the selector circuit 113 outputs the low signal Ssel_vref. Further, when the voltage VCC_div does not exceed the reference voltage Vref_vcc, the selector circuit 113 outputs the low signal Ssel_vref at the time point at which the voltage VCC_div exceeds the reference voltage Vref_vcc. Accordingly, the reference voltage circuit 106 outputs the reference voltage Vref_uvlo_h as the reference voltage. Accordingly, the target level of the output voltage Vout is switched to the first level, and after the power supply voltage Vcc rises, the reference voltage of the hysteresis comparator 107 rises to the reference voltage Vref_uvlo_h. Thus, the voltage Vcc_div is restrained from dropping below the reference voltage Vref_uvlo_h, and the operation of resetting the control IC is suppressed, as well as the level of the power supply voltage Vcc at which the control IC 42*a* is reset will be an appropriate level.

Second Embodiment

Figure 5:
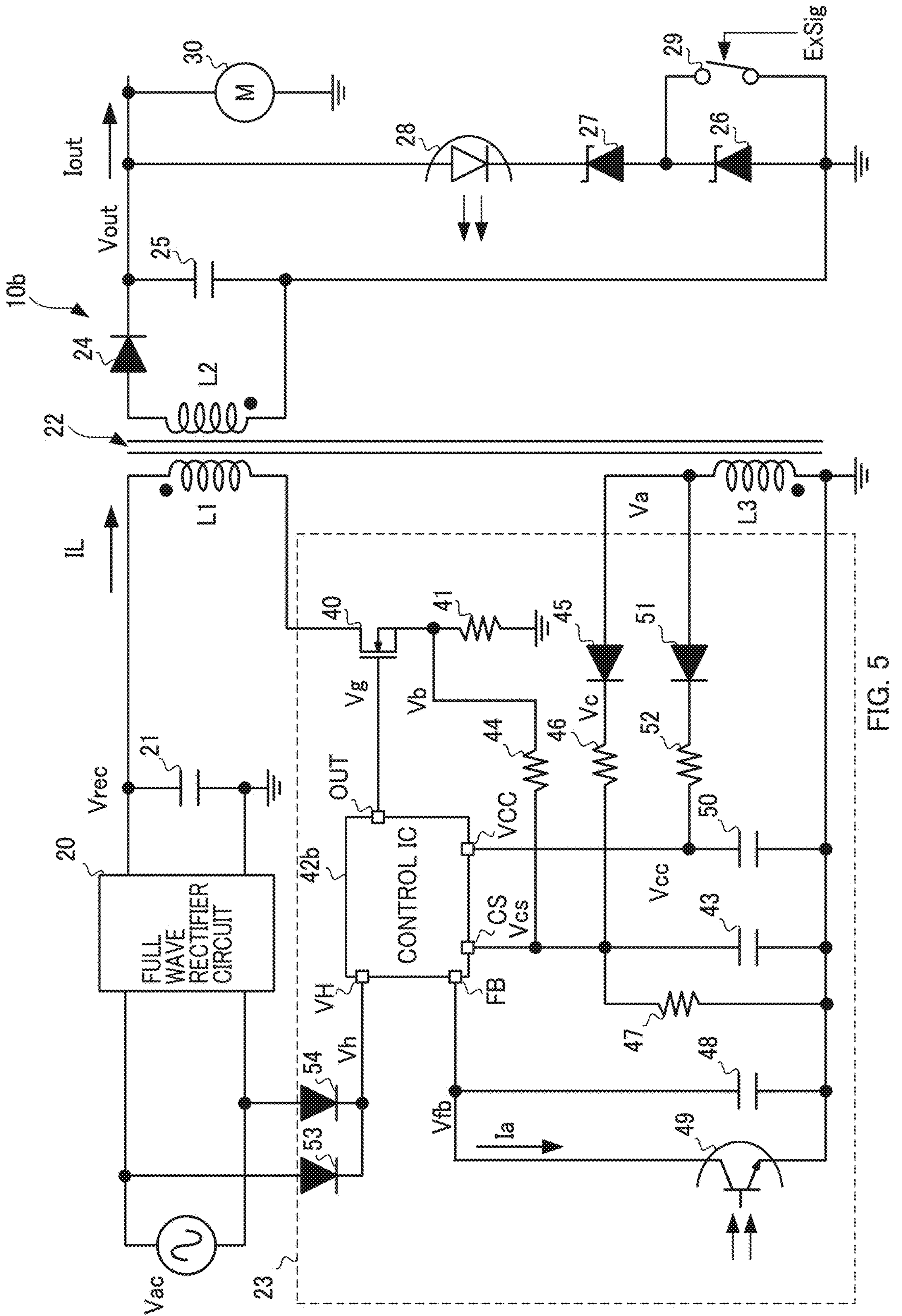
FIG. 5 is a diagram illustrating an example of a configuration of an AC-DC converter 10*b*.

FIG. 5 is a diagram illustrating an example of a configuration of an AC-DC converter 10*b*, which is a second embodiment of the present disclosure. The AC-DC converter 10*b* is different from the AC-DC converter 10*a* in that a control IC 42*b* does not have the terminal ZCD, and that the target level of the output voltage Vout of the AC-DC converter 10*b* is determined at the terminal CS. Accordingly, the voltage corresponding to the coil voltage Va at the auxiliary coil L3 when the power transistor 40 is off is applied to the terminal CS through the diode 45 and the resistor 46. In addition, the resistor 47 is provided between the terminal CS and the ground. Further, the voltage level of the voltage Vcs applied to the terminal CS when the power transistor 40 is off can be set by adjusting the voltage division ratio of the voltage divider circuit that includes the resistors 46 and 47.

Figure 6:
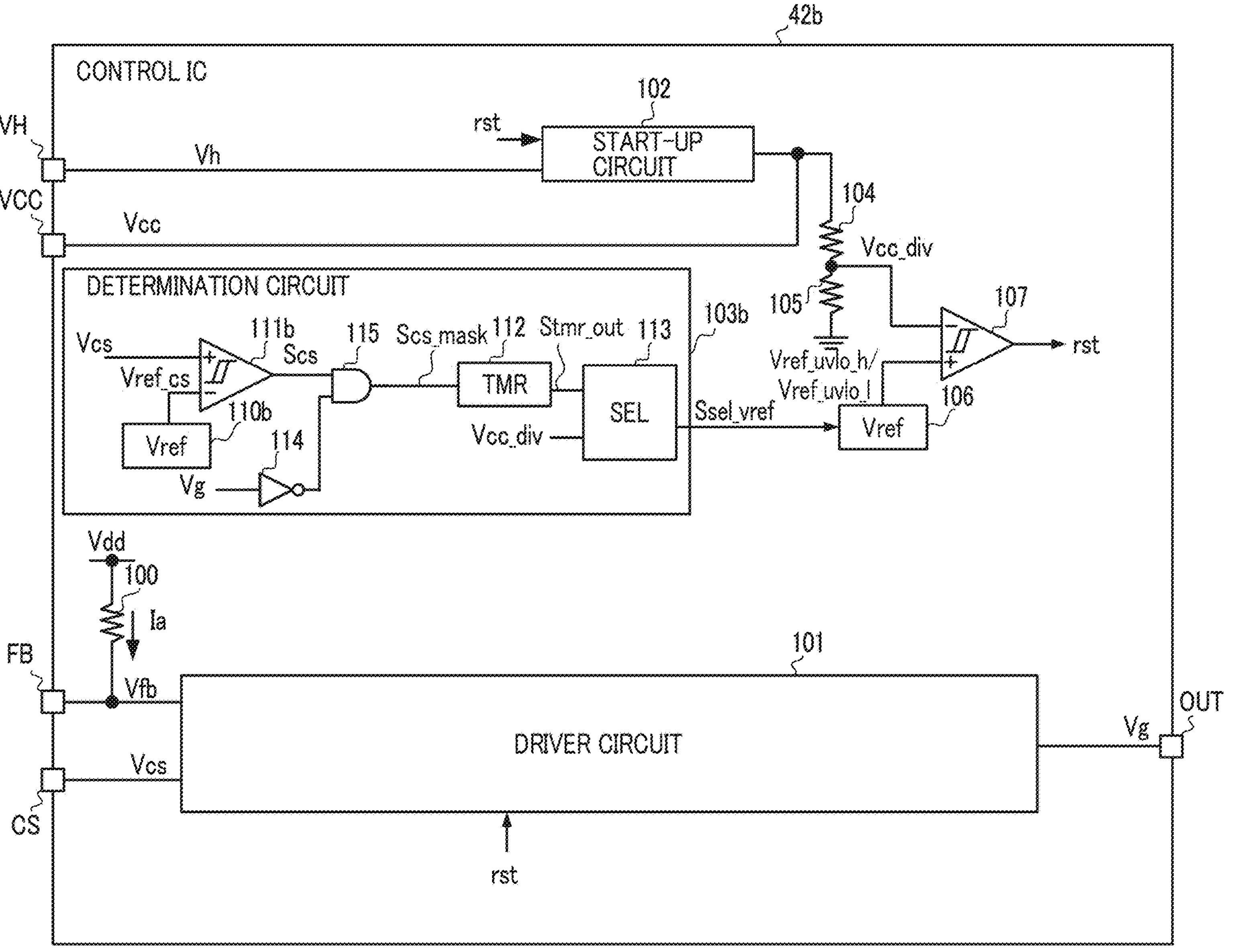
FIG. 6 is a diagram illustrating an example of a configuration of a control IC 42*b*.

FIG. 6 is a diagram illustrating an example of a configuration of the control IC 42*b*. As described above, the control IC 42*b* does not have the terminal ZCD, and determines the target level of the output voltage Vout of the AC-DC converter 10*b*, based on the voltage Vcs at the terminal CS when the power transistor 40 is off. The control IC 42*b* includes the resistors 100, 104 and 105, the driver circuit 101, the start-up circuit 102, a determination circuit 103*b*, the reference voltage circuit 106, and the hysteresis comparator 107. Note that the components other than the determination circuit 103*b* are the same as those of the control IC 42*a*, and thus the descriptions thereof are omitted.

===Determination Circuit 103*b*===

The determination circuit 103*b* determines the target level of the output voltage Vout of the AC-DC converter 10*b*, based on the voltage Vcs at the terminal CS, which is a voltage corresponding to the voltage Va at the auxiliary coil L3 when the power transistor 40 is off. The determination circuit 103*b* includes a reference voltage circuit 110*b*, a hysteresis comparator 111*b*, the timer (TMR) 112, the selector circuit (SEL) 113, an inverter circuit 114, and an AND circuit 115. The timer 112 and the selector circuit 113 are similar to those in the determination circuit 103*a*, and thus the descriptions thereof are omitted. Further, the operation of the timer 112 is slightly different, but the differences will be explained with the explanation of the operation of the control IC 42*b*.

===Reference Voltage Circuit 110*b*===

The reference voltage circuit 110*b* outputs a reference voltage Vref_cs.

====Hysteresis Comparator 111*b*====

The hysteresis comparator 111*b* compares the voltage Vcs with a voltage Vref_cs_h, Vref_cs_l generated from the reference voltage Vref_cs, in order to determine the target level of the output voltage Vout of the AC-DC converter 10*b*. Specifically, in response to the voltage Vcs exceeding the threshold voltage Vref_cs_h, the hysteresis comparator 111*b* outputs a high signal Scs. Meanwhile, in response to the voltage Vcs dropping below the voltage Vref_cs_l that is lower than the voltage Vref_cs_h, the hysteresis comparator 111*b* outputs a low signal Scs.

===Inverter Circuit 114 and AND Circuit 115===

The inverter circuit 114 outputs the signal indicating the time period during which the power transistor 40 is off, based on the drive voltage Vg. Further, the AND circuit 115 allows the signal Scs to pass therethrough only during the time period during which the power transistor 40 is off. As such, the signal Scs_mask to be outputted to the subsequent timer 112 is made similar to the signal Szcd in FIG. 2.

Note that in the second embodiment, the timer 112 determines that the target level is the second level, in response to the time period during which the voltage Vcs is lower than the voltage Vref_cs_l exceeding the time period Tcs_a. Meanwhile, in response to the time period during which the voltage Vcs is higher than the voltage Vref_cs_h exceeding the feedback Tcs_b, the timer 112 determines that the target level is the first level.

<<<Operation of Control IC **42*b***>>>

Figure 7:
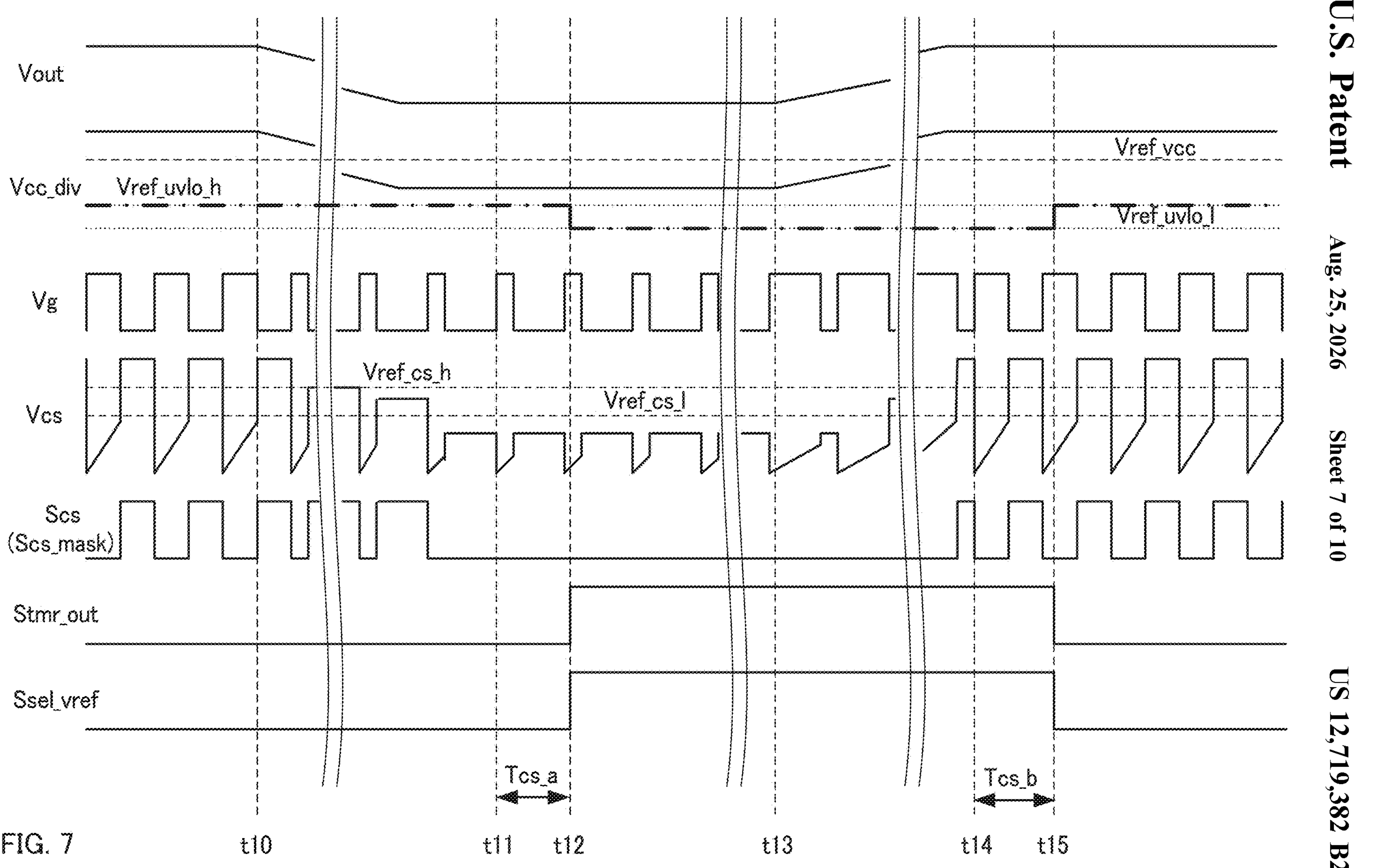
FIG. 7 is a diagram illustrating an example of an operation of a control IC 42*b*.

FIG. 7 is a diagram illustrating an example of an operation of the control IC **42*b*. The operation of the control IC 42*b* is different from the operation of the control IC 42*a* in FIG. 4 only in that the voltage Vcs is used to determine the target level of the output voltage Vout of the AC-DC converter 10*b*, and the operations other than that are the same as or similar to those of the control IC 42*a*. Thus, explanations regarding points other than change in the voltage Vcs are omitted. Further, time t10 to t15 in FIG. 7 correspond to time t0 to t5 in FIG. 4**.

In response to the switch 29 being turned on and the target level of the output voltage Vout being switched to the second level at time t10, the output voltage Vout starts to drop. Further, since the output voltage is detected as being high and the feedback voltage Vfb drops, the time period during which the power transistor 40 is on decreases in the switching period of the power transistor 40 of FIG. 5. As a result, the voltage Va at the auxiliary coil L3 in FIG. 5 drops, and the voltage Vcc_div also starts to drop. Thus, the voltage Vcs when the power transistor 40 is off gradually drops. However, since the voltage Vcs when the power transistor 40 is off is still higher than the reference voltage Vref_cs_l, the hysteresis comparator **111*b* outputs the high signal Scs when the power transistor 40** is off.

In response to the voltage Vcs when the power transistor 40 is off dropping below the reference voltage Vref_cs_l at time t11, the hysteresis comparator **111*b* outputs the low signal Scs. This causes the timer 112** to start measuring the time period during which the low signal Scs is inputted.

At time t12, at which the time period Tcs_a has elapsed since time t1*l*, the timer 112 outputs the high signal Stmr_out. Accordingly, the control IC **42*b* can determine that the target level of the output voltage Vout of the AC-DC converter 10*b* has reached the second level, based on the voltage Va at the auxiliary coil L3**, even without having the terminal ZCD.

In response to the switch 29 being turned off and the target level of the output voltage Vout being switched to the first level at time t13, the output voltage Vout starts to rise. Further, since the feedback voltage Vfb rises, the time period during which the power transistor 40 is on increases in the switching period of the power transistor 40 of FIG. 5. As a result, the voltage Va at the auxiliary coil L3 rises, and the voltage Vcc_div also starts to rise. Thus, the voltage Vcs when the power transistor 40 is off gradually rises. However, since the voltage Vcs is still lower than the reference voltage Vref_cs_h, the hysteresis comparator **111*b* outputs the low signal Scs when the power transistor 40** is off.

In response to the voltage Vcs when the power transistor 40 is off exceeding the reference voltage Vref_cs_h at time t14, the hysteresis comparator **111*b* outputs the high signal Scs. This causes the timer 112** to start measuring the time period during which the high signal Scs is inputted.

At time t15, at which the time period Tcs_b has elapsed since time t14, the timer 112 outputs the low signal Stmr_out. Accordingly, the control IC **42*b* can determine that the target level of the output voltage Vout of the AC-DC converter 10*b* has reached the first level, based on the voltage Va at the auxiliary coil L3**, even without having the terminal ZCD.

Third Embodiment

Figure 8:
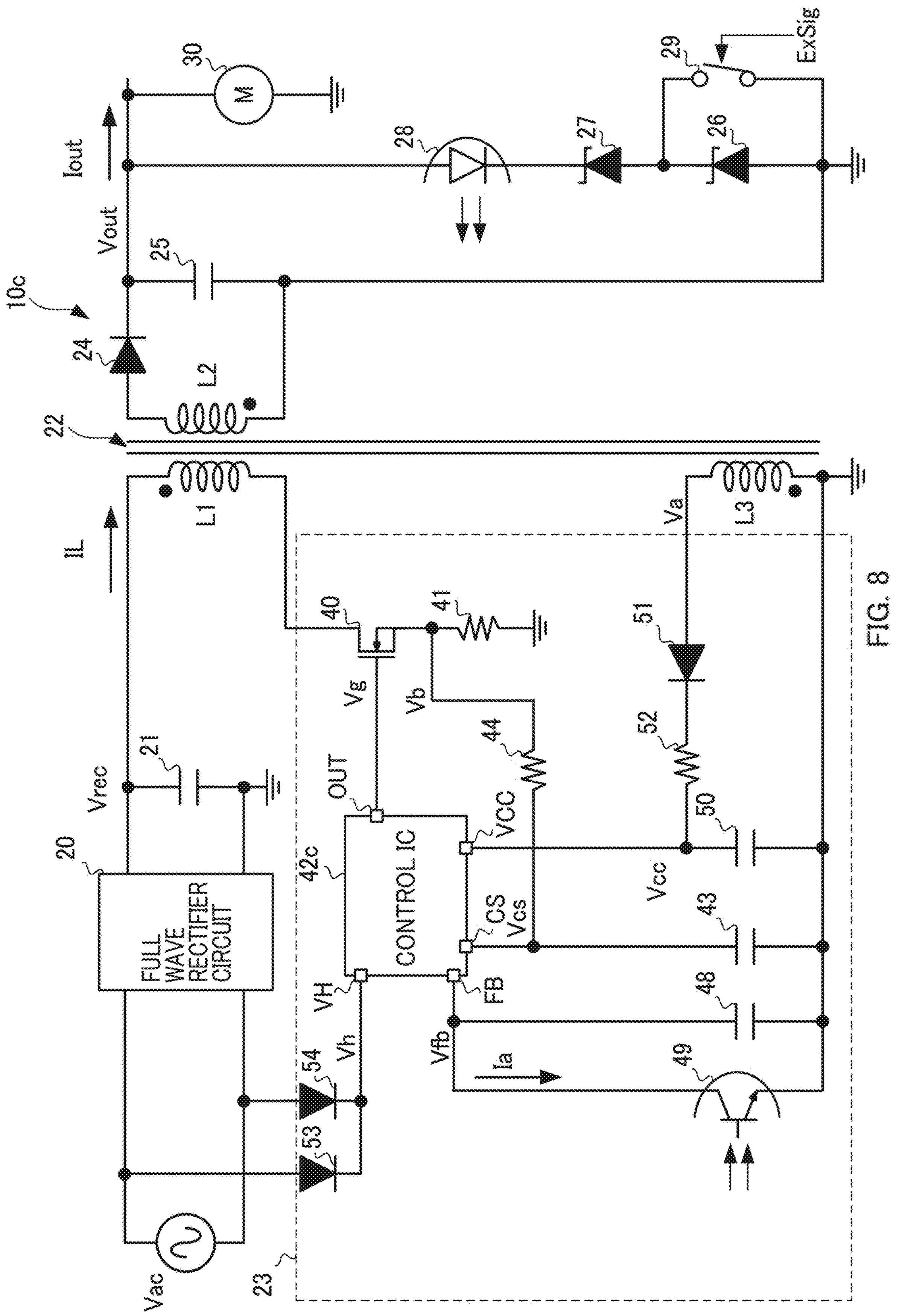
FIG. 8 is a diagram illustrating an example of a configuration of an AC-DC converter 10*c*.

FIG. 8 is a diagram illustrating an example of a configuration of an AC-DC converter **10*c*, which is a third embodiment of the present disclosure. The AC-DC converter 10*c* is different from the AC-DC converter 10*a* in that the target level of the output voltage Vout of the AC-DC converter 10*c*** is determined using the power supply voltage Vcc.

Figure 9:
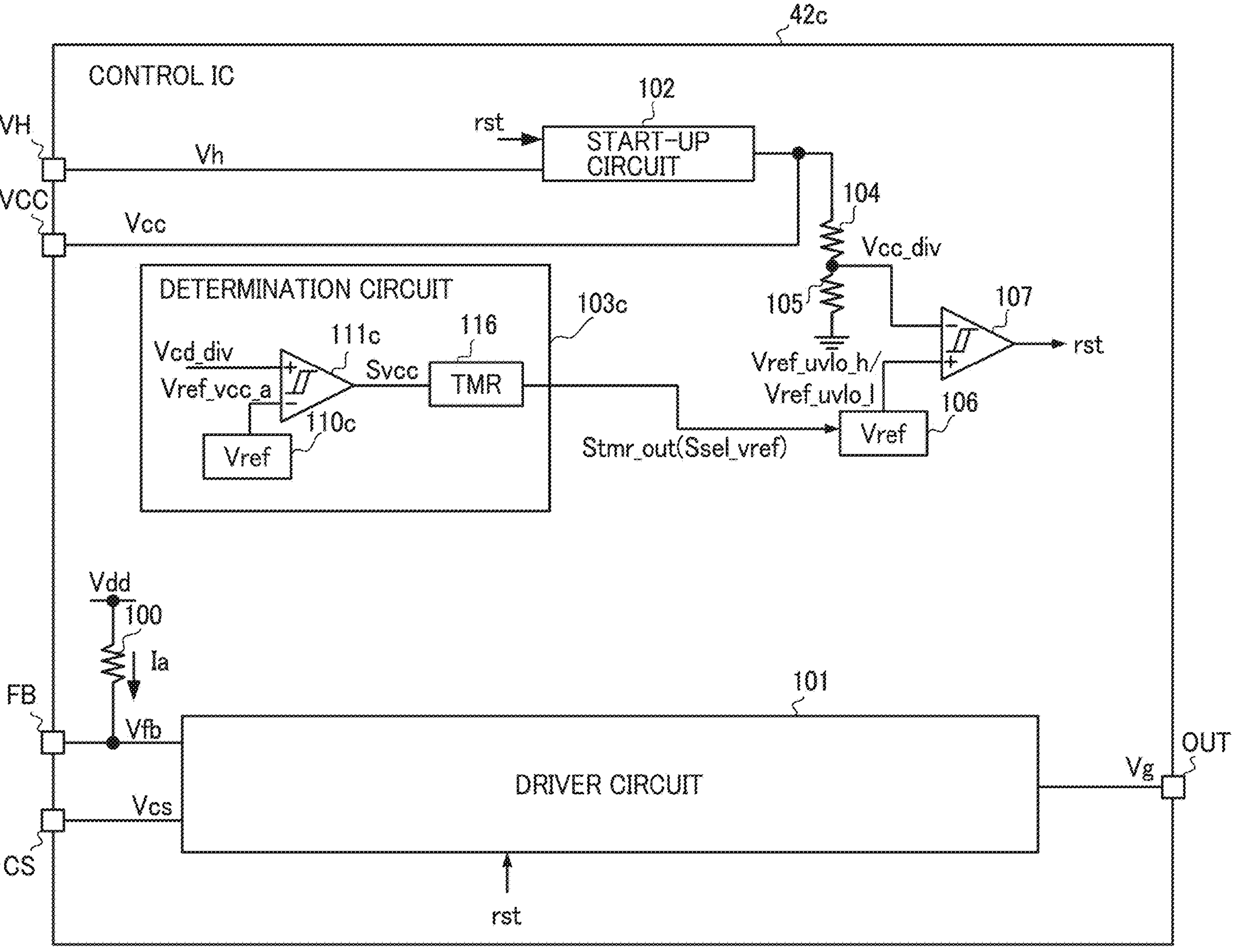
FIG. 9 is a diagram illustrating an example of a configuration of a control IC 42*c*.

FIG. 9 is a diagram illustrating an example of a configuration of the control IC **42*c*. As described above, the control IC 42*c* determines the target level of the output voltage Vout of the AC-DC converter 10*c*, based on the power supply voltage Vcc. The control IC 42*c* includes the resistors 100, 104, and 105, the driver circuit 101, the start-up circuit 102, a determination circuit 103*c*, the reference voltage circuit 106, and the hysteresis comparator 107. Since the components other than the determination circuit 103*c* are the same as or similar to those of the control IC 42*a***, the explanations thereof are omitted.

===Determination Circuit **103*c***===

The determination circuit **103*c* determines the target level of the output voltage Vout of the AC-DC converter 10*c*, based on the voltage Vcc_div corresponding to the power supply voltage Vcc at the terminal VCC, which will be the voltage corresponding to the voltage Va at the auxiliary coil L3. The determination circuit 103*c* includes a reference voltage circuit 110*c*, a hysteresis comparator 111*c*, and a timer (TMR) 116**.

===Reference Voltage Circuit **110*c***===

The reference voltage circuit **110*c*** outputs a reference voltage Vref_vcc_a.

====Hysteresis Comparator **111*c***====

The hysteresis comparator **111*c* compares the voltage Vcc_div with a voltage Vref_vcc_a_h, Vref_vcc_a_l generated from the reference voltage Vref_vcc_a, in order to determine the target level of the output voltage Vout of the AC-DC converter 10*c*. Specifically, in response to the voltage Vcc_div exceeding the voltage Vref_vcc_a_h, the hysteresis comparator 111*c* outputs a high signal Svcc. Meanwhile, in response to the voltage Vcc_div dropping below the voltage Vref_vcc_a_l that is lower than the voltage Vref_vcc_a_h, the hysteresis comparator 111*c*** outputs the low signal Svcc.

===Timer 116===

The timer 116 is a circuit to more reliably determine the target level of the output voltage Vout of the AC-DC converter **10*c*, in response to the signal Svcc. Specifically, in response to the time period during which the hysteresis comparator 111*c* continues to output the low signal Svcc continues for a time period Tvcc_a, the timer 116 outputs the high signal Stmr_out indicating that the target level of the output voltage Vout is the second level. Meanwhile, in response to the time period during which the hysteresis comparator 111*c* outputs the high signal Svcc continues for a time period Tvcc_b, the timer 116 outputs the low signal Stmr_out indicating that the target level of the output voltage Vout is the first level. This makes it possible to switch the signal Stmr_out indicating the target level, in response to the state in which the target level of the output voltage Vout of the AC-DC converter 10*c*** has changed continues for a predetermined time period. Note that the voltage Vcc_div corresponds to a "voltage corresponding to a power supply voltage".

<Operation of Control IC **42*c***>>>

Figure 10:
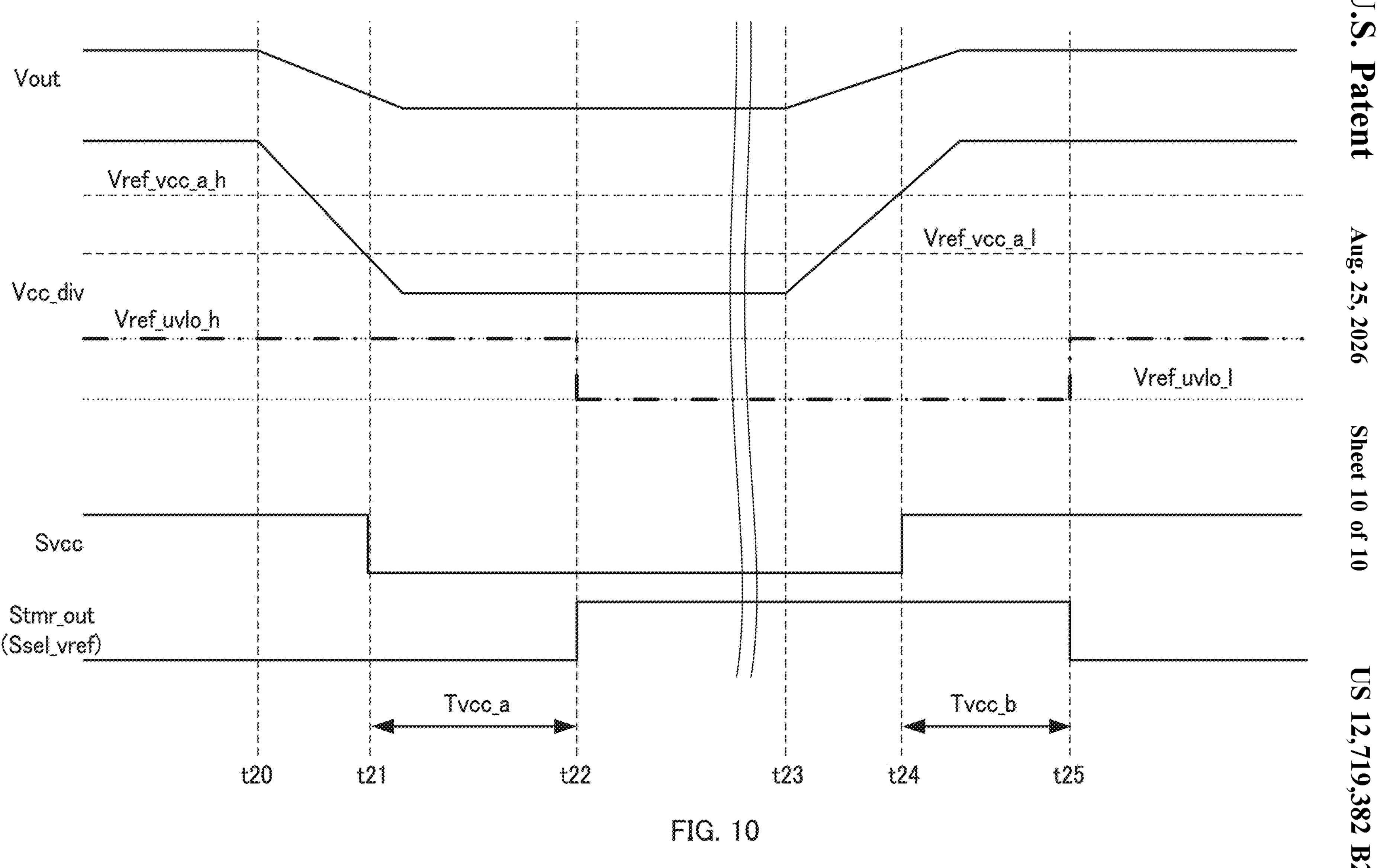
FIG. 10 is a diagram illustrating an example of an operation of a control IC 42*c*.

FIG. 10 is a diagram illustrating an example of an operation of the control IC **42*c*. It is assumed that the target level of the output voltage Vout of the AC-DC converter 10*c* is the first level before time t20. Further, the reference voltage outputted by the reference voltage circuit 106** is given by a dashed-dotted line below the voltage Vcc_div.

In response to the switch 29 being turned on and the target level of the output voltage Vout being switched to the second level at time t20, the output voltage Vout starts to drop. Further, since the output voltage Vout is detected as being high and the feedback voltage Vfb drops, the time period during which the power transistor 40 is on decreases in the switching period of the power transistor 40 of FIG. 8. As a result, the voltage Va at the auxiliary coil L3 in FIG. 8 drops, and the voltage Vcc_div also starts to drop. However, since the voltage Vcc_div is still higher than the reference voltage Vref_vcc_a_l, the hysteresis comparator 111*c* outputs the high signal Svcc.

In response to the voltage Vcc_div drops below the reference voltage Vref_vcc_a_l at time t21, the hysteresis comparator 111*c* outputs the low signal Svcc. This causes the timer 116 to start measuring the time period during which the low signal Svcc is received.

At time t22, at which the time period Tvcc_a has elapsed since time t21, the timer 116 outputs the high signal Stmr_out (that is, Ssel_vref). Thus, the reference voltage circuit 106 outputs the reference voltage Vref_uvlo_l as the reference voltage. Accordingly, even if the target level of the output voltage Vout is switched to the second level and the voltage Vcc_div drops, the reference voltage of the hysteresis comparator 107 drops, and thus the operation of resetting the control IC is suppressed.

In response to the switch 29 being turned off and the target level of the output voltage Vout being switched to the first level at time t23, the output voltage Vout starts to rise. Further, since the output voltage Vout is detected as having been lowered and the feedback voltage Vfb rises, the time period during which the power transistor 40 is on increases in the switching period of the power transistor 40 of FIG. 8. As a result, the voltage Va at the auxiliary coil L3 rises, and the voltage Vcc_div also starts to rise. However, since the voltage Vcc_div is still lower than the reference voltage Vref_vcc_a_h, the hysteresis comparator 111*c* outputs the low signal Svcc.

In response to the voltage Vcc_div exceeding the reference voltage Vref_vcc_a_h at time t24, the hysteresis comparator 111*c* outputs the high signal Svcc. This causes the timer 116 to start measuring the time period during which the high signal Svcc is received.

At time t25, at which the time period Tvcc_b has elapsed since time t24, the timer 116 outputs the low signal Stmr_out (Ssel_vref). Accordingly, the reference voltage circuit 106 outputs the reference voltage Vref_uvlo_h as the reference voltage. This switches the target level of the output voltage Vout to the first level, and the reference voltage of the hysteresis comparator 107 rises after the power supply voltage Vcc rises, and thus the operation of resetting the control IC 42*c* is suppressed and the level of the power supply voltage Vcc at which the control IC 42*c* is reset will be an appropriate level.

SUMMARY

The AC-DC converter 10*a* according to an embodiment of the present disclosure has been described above. The control IC 42*a* includes the terminal VCC, the determination circuit 103*a*, the hysteresis comparator 107, and the driver circuit 101. This makes it possible to provide an integrated circuit capable of suppressing the reset operation of a control IC even if the target level of an output voltage of a power supply circuit is switched.

Further, the control IC 42*a* includes the reference voltage circuit 106, and the determination circuit 103*a* includes the hysteresis comparator 111*a* and the timer 112. This makes it possible to determine that the target level of the output voltage Vout of the AC-DC converter 10*a* has changed, in response to the state in which the target level has changed continuing for a predetermined time period, thereby suppressing erroneous determinations caused by noise.

Further, the control IC 42*a* further includes the terminal ZCD, and the determination circuit 103*a* is connected to the terminal ZCD. Accordingly, a dedicated terminal to receive the voltage Va at the auxiliary coil L3 is provided, thereby being able to relatively freely set the voltage division ratio of the external resistors 46 and 47, which makes it easier to change the voltage level of the output voltage Vout.

Further, the control IC 42*b* includes the terminal CS, and the determination circuit 103*b* is connected to the terminal CS. This makes it possible to detect the voltage Va at the auxiliary coil L2, to determine the target level of the output voltage Vout without providing a dedicated terminal, and also reduce the number of external components.

Further, the determination circuit 103*a*, 103*b* includes the selector circuit 113. This makes it possible to switch the reference voltage outputted by the reference voltage circuit 106 to the voltage Vref_uvlo_h after confirming a rise in the power supply voltage Vcc, thereby being able to suppress the reset operation.

Further, the determination circuit 103*c* is connected to the terminal VCC. Accordingly, due to a change in the power supply voltage Vcc, when the reference voltage circuit 106 outputs the voltage Vref_uvlo_h, the power supply voltage Vcc has already exceeded the voltage Vref_vcc_a_h, thereby being able to suppress the reset operation.

An embodiment of the present disclosure described above is simply to facilitate understanding of the present disclosure and is not in any way to be construed as limiting the present disclosure. The present disclosure may variously be changed or altered without departing from its essential features and encompass equivalents thereof.

The present disclosure is directed to provision of an integrated circuit capable of suppressing the reset operation of a control IC even if the target level of the output voltage of a power supply circuit is switched.

According to the present disclosure, it is possible to provide an integrated circuit capable of suppressing the reset operation of a control IC even if the target level of the output voltage of a power supply circuit is switched.

What is claimed is:

1. An integrated circuit for a power supply circuit configured to generate an output voltage from an input voltage thereof and control the output voltage so as to be at a target level, the power supply circuit including a transformer that includes a primary coil, a secondary coil, and an auxiliary coil, and a transistor configured to control a current flowing through the primary coil, the integrated circuit being configured to drive the transistor, the integrated circuit comprising:

a first terminal configured to receive a power supply voltage corresponding to a coil voltage at the auxiliary coil;

a determination circuit configured to determine whether the target level of the output voltage is a first level or a second level lower than the first level, based on the coil voltage;

a first comparator circuit configured to compare a first voltage corresponding to the power supply voltage with a first reference voltage, the first reference voltage being at a third level when the target level is the first level, and being at a fourth level lower than the third level when the target level is the second level; and a driver circuit configured to drive the transistor when the first voltage is higher than the first reference voltage, and stop driving the transistor when the first voltage is lower than the first reference voltage.

2. The integrated circuit according to claim 1, further comprising:

a reference voltage circuit configured to output the first reference voltage at a level corresponding to a determination result of the determination circuit, wherein the determination circuit includes a second comparator circuit configured to compare a second voltage corresponding to the coil voltage with a second reference voltage, and an output circuit configured to output the determination result to indicate that the target level is the first level, when a state in which the second voltage is higher than the second reference voltage continues for a first time period, and output the determination result to indicate that the target level is the second level, when a state in which the second voltage is lower than the second reference voltage continues for a second time period.

3. The integrated circuit according to claim 2, further comprising:

a second terminal configured to receive the second voltage, wherein the determination circuit is connected to the second terminal.

4. The integrated circuit according to claim 2, further comprising:

a third terminal configured to receive a voltage corresponding to a current flowing through the transistor, when the transistor is on, and the second voltage corresponding to the coil voltage, when the transistor is off, wherein the determination circuit is connected to the third terminal.

5. The integrated circuit according to claim 3, wherein the determination circuit includes a selector circuit configured to cause the reference voltage circuit to output the first reference voltage at the third level, responsive to the determination result indicating that the target level is the first level and the power supply voltage reaching a fifth level higher than the third level, and cause the reference voltage circuit to output the first reference voltage at the fourth level, responsive to the determination result indicating that the target level is the second level.

6. The integrated circuit according to claim 2, wherein the second voltage is a voltage corresponding to the power supply voltage, and the determination circuit is connected to the first terminal.

7. A power supply circuit configured to generate an output voltage from an input voltage and control the output voltage so as to be at a target level, the power supply circuit comprising:

a transformer including a primary coil, a secondary coil, and an auxiliary coil;

a transistor configured to control a current flowing through the primary coil; and an integrated circuit configured to drive the transistor, the integrated circuit including a first terminal configured to receive a power supply voltage corresponding to a coil voltage of the auxiliary coil, a determination circuit configured to determine whether the target level of the output voltage is a first level or a second level lower than the first level, based on the coil voltage, a first comparator circuit configured to compare a first voltage corresponding to the power supply voltage with a first reference voltage, the first reference voltage being at a third level when the target level is the first level, and being at a fourth level lower than the third level when the target level is the second level, and a driver circuit configured to drive the transistor, when the first voltage is higher than the first reference voltage, and stop driving the transistor, when the first voltage is lower than the first reference voltage.

* * * * *